Sept. 11, 1945.   F. H. OWENS   2,384,637
FLIM MAGAZINE
Original Filed May 19, 1944   2 Sheets-Sheet 1
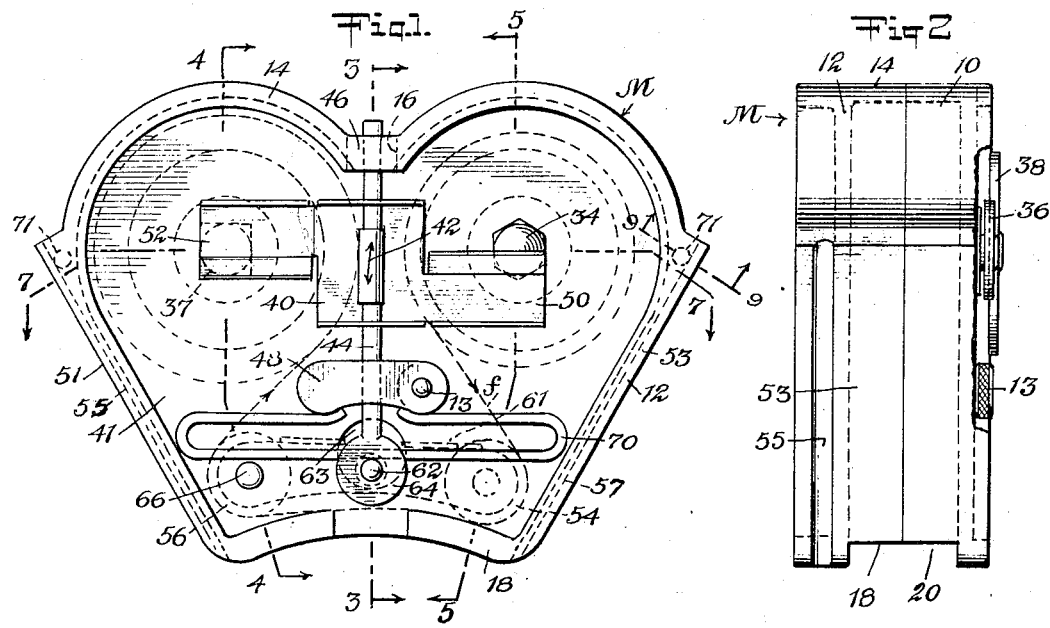
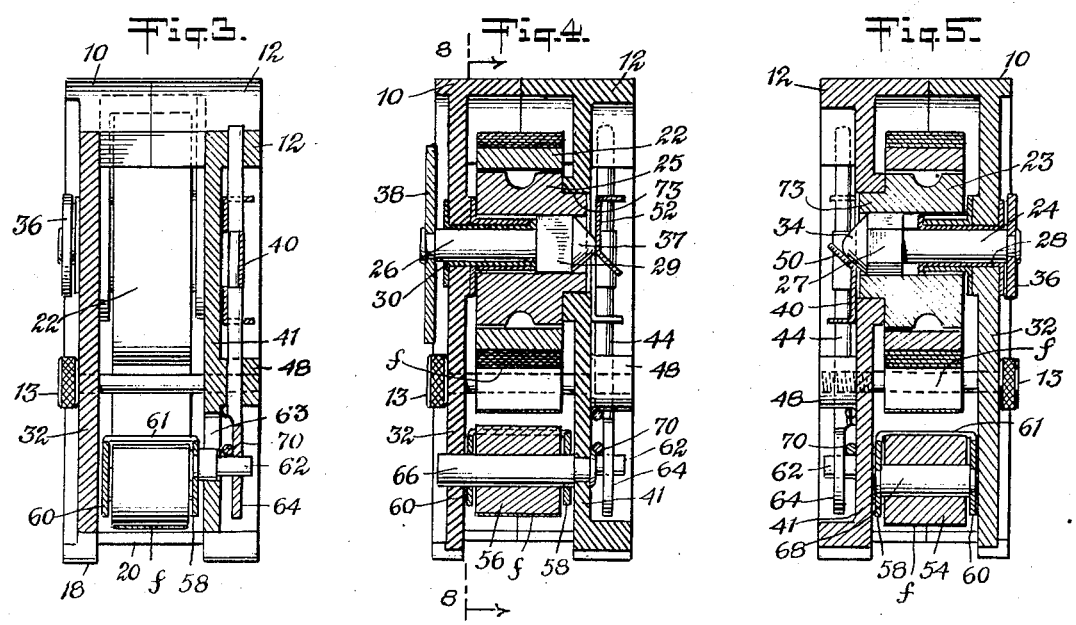
INVENTOR.
Freeman H. Owens
BY
*James H. Franklin*
Attorneys Sept. 11, 1945.  F. H. OWENS  2,384,637
FLIM MAGAZINE
Original Filed May 19, 1944  2 Sheets-Sheet 2
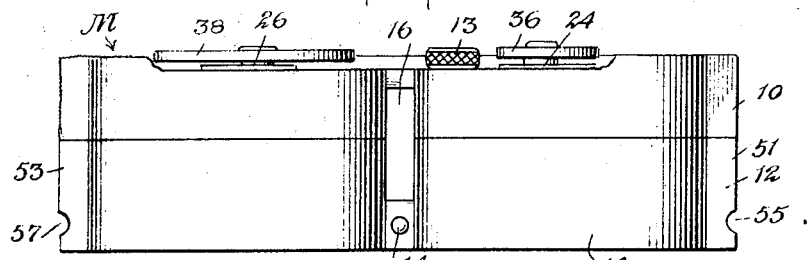
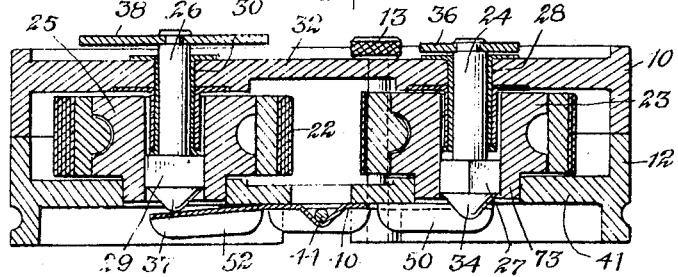
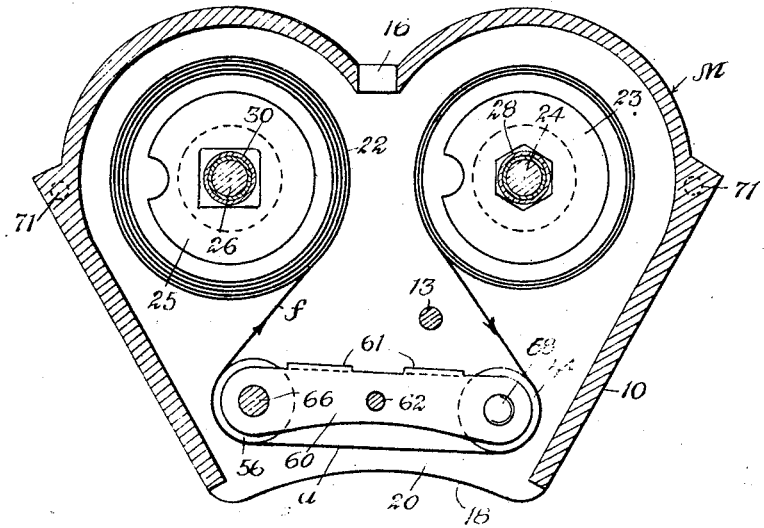
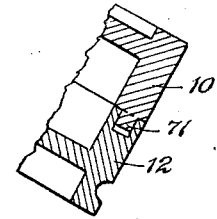
INVENTOR.
Freeman H. Owens
BY
James & Franklin
Attorneys

Patented Sept. 11, 1945

2,384,637

UNITED STATES PATENT OFFICE 2,384,637

FILM MAGAZINE

Freeman H. Owens, New York, N. Y.

Original application May 19, 1944, Serial No. 536,344. Divided and this application May 19, 1944, Serial No. 536,345

17 Claims. (Cl. 242—71)

This invention relates to a film magazine for a film projecting machine.

The prime object of the invention relates to the provision of a novel film magazine especially designed for use in a film projecting machine as disclosed in my copending application Serial No. 536,344, filed May 19, 1944, of which the present is a divisional application, and particularly in a film drive and rewinding mechanism as disclosed in my copending application Serial No. 536,346, filed May 19, 1944.

In such a film projecting machine a selected film magazine is moved into and out of projection position in an optical projection system. When moved into projection position, the film in the magazine is machine fed from the supply spool and is wound up on the takeup spool, and in the course of being moved out of projection position, the film in the magazine is rewound on the supply spool. For these purposes the projection machine is provided with a film driving mechanism adapted to be continuously operated and comprising simply a film feeding or driving drum and a driving plate. For cooperation with this film driving mechanism, the film magazine is constructed so that its supply and takeup reels are provided with drive elements selectively connectable to the driving plate for winding the film during a projection run (the magazine in projection position), and for rewinding the film after a projection run (during the movement of the magazine out of projection position), and the magazine is also made to embody a device engageable with and disengageable from the film feeding drum of the machine to feed the film during a projection run and to free the film for rewinding after a projection run.

The prime desideratum of the present invention centers about the provision of a novel film magazine of this character constructed and adapted for this purpose.

To the accomplishment of this prime object and such other objects as may hereinafter appear, my present invention relates to the film magazine unit as sought to be defined in the appended claims and as described in the following specification taken together with the accompanying drawings in which:

Fig. 1 is a top elevational view of the film magazine;

Fig. 2 is a right side elevational view thereof;

Fig. 3 is a view thereof taken in medial cross-section in the plane of the line 3—3 of Fig. 1;

Fig. 4 is a view thereof taken in cross-section in the planes of the broken line 4—4 of Fig. 1;

Fig. 5 is a view thereof taken in cross-section in the planes of the broken line 5—5 of Fig. 1;

Fig. 6 is a rear side elevational view thereof;

Fig. 7 is a view thereof taken in cross-section in the planes of the broken line 7—7 of Fig. 1;

Fig. 8 is a view thereof taken in cross-section in the plane of the line 8—8 of Fig. 4; and Fig. 9 is a view of a detail taken in cross-section in the plane of the line 9—9 of Fig. 1.

Referring now more in detail to the drawings, the film magazine generally designated as M comprises a casing conveniently made in two mating sections 10 and 12 secured together in any approved way as by means of the thumb screw 13, the said film magazine being given any desired configuration and being preferably made sector shaped as best shown in Figs. 1 and 8 of the drawings, so that the same may fit into a sector portion of a rotatable carrier, it being intended that a plurality of such magazines M be mounted on said carrier and arranged circumferentially about the carrier in side by side abutting relation. When the casing parts 10 and 12 are assembled, the rear wall 14 thereof has defined centrally therein an orifice or opening 16 for admitting a beam of projected light therethrough to be incident upon and transmitted through a central guided portion $a$ of the film $f$ in the magazine (see particularly Figs. 6 and 8).

The magazine M is fully open at its front wall 18 which is arcuately formed thus providing the arcuate opening 20. The opening 20 is adapted to receive a film driving drum (not shown) with the periphery of which the guided section $a$ of the film $f$ is adapted to engage and disengage. When this guided portion of the film is engaged with the driving drum, the film is fed or driven in the direction shown by the arrows in Figs. 1 and 8; and when it is disengaged from the driving drum, the film is free to be moved in the magazine in the opposite direction. The magazine casing sections house a film reel 22 having a supply (and rewinding) spool 23 and a takeup (or winding) spool 25, the spool 23 being mounted on and rotatable by the spool spindle 24, and the spool 25 being mounted on and rotated by a spool spindle 26. These spool spindles 24 and 26 are suitably journaled in the casing section 10, and more particularly in the telescoping flanged sleeve sets 28 and 30 respectively fitted to the wall 32 of the magazine casing section 10.

The spool spindles 24 and 26 are each mounted for axial movement in the spools 23 and 25 and in the journaling sleeves 28 and 30.

The spool spindles 24 and 26, therefore, have a plunger action within the spools 23 and 25. The spindles and spools rotate together, however, and to this end the spindle 24 is formed with a hexagonal portion 27 and the spindle 26 is formed with a square portion 29, and the bores of the spools 23 and 25 are correspondingly contoured in cross-section. Each of the spindles is tapered or cammed at one end and provided with a drive element at the other end. Thus the spindle 24 is tapered or cammed at one end as at 34 and provided at its other end with a drive element in the form of a drive wheel or disc 36, and the spindle 26 is tapered or cammed at one end as at 37 and provided at its other end with a drive element in the form of a drive wheel or disc 38. The said spindles 24 and 26 are thus movable axially to move their exposed drive wheels 36 and 38 axially outwardly to operative positions and axially inwardly to inoperative positions. In the position shown in the drawings, the drive wheel 38 has been moved outwardly to an operative position and the drive wheel 36 inwardly to an inoperative position.

The magazine M is also provided with means for axially moving the film spool spindles and their drive elements. Such means is made to simply comprise a resilient cam plate 40 mounted for reciprocation on the wall 41 of the casing section 12 in the directions indicated by the double arrow 42 shown in Fig. 1, the said cam plate being fixed to and reciprocated by a rod 44 which is movably anchored in said casing wall 41 at one end 46 (in a part of the housing section) and at an intermediate point by means of the bar 48 fixed to or forming part of the housing section wall 41. The cam plate 40 has two oppositely directed wings 50 and 52, each formed with a flat and an inclined face (see particularly Figs. 4 and 5), the cam wing 50 cooperating with the spindle end 34 and the cam wing 52 cooperating with the spindle end 37.

In the position shown in the drawings the cam wing 52 has engaged the cam end 37 of the spindle 26 and has moved this spindle axially outwardly to the position best shown in Figs. 4 and 7, while the cam wing 50 is disengaged from the end 34 of the spindle 24 permitting this spindle to move axially inwardly to the position best shown in Figs. 5 and 7 of the drawings. In this position the cam plate 40 has been moved radially inwardly (Fig. 1). When the cam plate 40 is moved radially outwardly by its operating rod 44, then the cam wing 52 disengages the spindle end 37 while the cam wing 50 engages the spindle end 34 with the result that the spindle 24 and its drive wheel 36 are moved axially outwardly while the spindle 26 and its drive wheel 38 are permitted to return axially inwardly to an inoperative position.

The magazine M is further provided with a pair of guide rolls 54 and 56 journalled in the spaced guide plates 58 and 60, the said guide plates being connected together by the spaced webs 61 and being medially connected by means of a stud 62 to a circular boss 64 formed at the inner end of the reciprocating rod 44. The stud 62 is movable in the aperture 63 formed in the wall 41 of the magazine section 12 and is limited in its movement in opposite directions by the wall of this aperture. The plates 58 and 60 are secured together at their ends by means of the guide roll pins or spindles 66 and 68 and the pin 66 may be fitted in or anchored to the wall 32 of the casing section 10 whereby the plates and guide rolls forming together a film guide device may pivot about this pin.

Engaging the connecting stud 62 is a double loop spring 70 anchored medially and opposite the stud 62 to the bar 48. This spring is tensioned to act directly on the stud 62 and thereby the film guide device and particularly the guide rolls 54 and 56 are urged to the position as shown, for example, in Fig. 1, so that the film may be engaged by the periphery of the film driving or feeding drum above referred to, to be driven thereby. Also by this means the rod 44 and the resilient cam plate 40 are resiliently moved to the position shown in the drawings with the takeup spool drive plate 38 in its outward or operative position.

The film reel 22 thus comprises a film f adapted during a projection run to be fed from the supply spool 23 and guided by the guide rolls 54 and 56 located at a film feeding position in the magazine and adapted to be wound on the takeup spool 25, the film moving during said projection run in the arrowed direction shown in Figs. 1 and 8 of the drawings. This is the normal position that all the parts of the magazine assume when the magazine is placed or mounted on the carrier of the projection machine. The film magazine M is adapted to be removably receivable in the carrier; and for anchoring the magazine to the carrier the magazine is formed in its side walls 51 and 53 with grooves 55 and 57, these grooves being formed in the magazine casing section 12 and preferably in a plane coincident with or close to the plane of movement of the cam plate 40. These grooves 55 and 57 are adapted to be received by rods (not shown) extending radially of the carrier, a rod being adapted for receiving abutting grooves of adjacent magazines, whereby a plurality of magazines may be arranged circumferentially of the carrier all in side by side abutting relation.

The film magazine has three different operative phases. During a projection run the film in the magazine is driven or fed by the annular drum of the machine engaging the guided section a of the film f, and at such time the film is wound on the takeup spool by the operative engagement of the takeup drive wheel 38 with the rotating drive plate of the machine above referred to. After a projection run and during the movement of the film magazine out of projection position, it is intended that the film f in the magazine be rewound on its supply spool 23 by the operative engagement of its drive wheel 36 with the said drive plate. The third operative phase is when the film magazine is out of projection position but is stationary instead of moving; and in this last mentioned phase it is intended that the film in the magazine be neither wound nor rewound, this being accomplished when both of the drive wheels 38 and 36 are in an intermediate or neutral position where neither operatively engages the driving plate.

These three operative phases of the magazine are effected by operating the circular end 64 of the reciprocating rod 44 against the action of the spring 70. The first operative phase has been described above, the parts being in the position shown in the drawings; the film is driven or fed between the guide rolls 54 and 56 by the engagement of the film portion a with the driving drum and the film is wound on the takeup spool 25 by the rotation of the drive wheel 38 now in operative position. When the operating rod 44 is pressed radially outwardly as by pushing its circular end 64 against the action of the spring 70, the cam plate 40 is moved to its other extreme position, the cam wing 52 disengaging the spindle 26 and the cam wing 50 engaging the spindle 24. As a result the spindle 24 is moved axially outwardly and the spindle 26 is released so that it is free to move axially inwardly. Now, the supply or rewinding spool drive 36 is in operative position (and the winding drive 38 in inoperative position) and rotation of the drive wheel 36 effects the rewinding of the reel. At the same time the film guide device has been moved by means of the connecting stud 62 inwardly of the magazine about the pivot pin 66, thus freeing the guided portion a of the film from the driving drum. In the third operative phase the rod 44 is moved to a position intermediate of its extreme positions, and in such intermediate position the wings 50 and 52 of the cam plate 40 are both disengaged from the cam ends of the spindles 24 and 26, thus permitting both drive wheels 36 and 38 to move axially inwardly to neutral or non-engaging positions.

The magazine and magazine parts may be suitably formed for desirably encasing the operating elements and suitably supporting the operated elements. The magazine sections 10 and 12 may be made in two mating molded parts. These may be interfitted by means of the dowel pins 71, 71 formed in one of the casing sections. The top wall 41 of the casing section 12 may be recessed to house the cam plate 40 and associated parts and the wall 32 of the casing section 10 may also be recessed to house the drive wheels 36 and 38, as will be clear from viewing Figs. 3 to 5 of the drawings. The spools 23 and 25 are held between the casing sections and in addition to being mounted on the journaled spindles, are also rabbeted as at 73, 73 for interfitting with holes in the wall 41 of the casing section 12.

The use and operation of the film magazine of my present invention and the many advantages thereof particularly in its employment with the projection machine referred to, will be fully apparent from the above detailed description thereof. By means of this magazine construction the structure of the film projection machine may be considerably simplified. The magazine may be quickly placed in position in the machine and when so placed is ready for operation. The magazine may be wound and rewound in and during the operation of the machine, and need only be removed from the machine for repair or replacement.

It will be obvious that while I have described my invention in the preferred form, may changes may be made therein without departing from the spirit of the invention defined in the following claims.

I claim:

1. A film magazine comprising a casing, a film supply spool in said casing having an axially movable spindle provided at an exposed end with a drive wheel, a film takeup spool in said casing also having an axially movable spindle provided at an exposed end with a drive wheel, the said spindles being movable to move said drive wheels axially outwardly to operative positions and axially inwardly to inoperative positions.

2. The film magazine of claim 1 in which the drive wheels are friction discs, the supply spool disc having a relatively small diameter and the takeup spool disc a relatively large diameter.

3. The film magazine of claim 1 in which the spindles extend outwardly on opposite sides of the casing and are shaped at their ends opposite the drive wheel ends for operative engagement.

4. A film magazine comprising a casing, a film supply spool in said casing having an axially movable spindle provided at an exposed end with a drive wheel, a film takeup spool in said casing also having an axially movable spindle provided at an exposed end with a drive wheel, and means on said casing for moving the takeup spool spindle axially outwardly to position its drive wheel operatively for a film winding operation and for moving the supply spool spindle axially outwardly to position its drive wheel operatively for a film rewinding operation.

5. A film magazine comprising a casing, a film supply spool in said casing having an axially movable spindle provided at an exposed end with a drive wheel, a film takeup spool in said casing also having an axially movable spindle provided at an exposed end with a drive wheel, and means on said casing for alternately moving the takeup and supply spool spindles axially outwardly to position the drive wheels thereof operatively for a film winding operation and for a film rewinding operation respectively.

6. The film magazine of claim 5 in which the said means comprises a reciprocable cam plate for alternately engaging and moving the said spindles.

7. The film magazine of claim 5 in which the said means comprises a reciprocable cam plate movable on the magazine between a position where it engages and moves the takeup spool spindle and a position where it engages and moves the supply spool spindle.

8. The film magazine of claim 5 in which the spindles extend outwardly on opposite sides of the casing and are cam shaped at their ends opposite the drive wheel ends, and in which the said means comprises a reciprocable cam plate movable on the magazine between a position where it engages the cam end of the takeup spool spindle and a position where it engages the cam end of the supply spool spindle for alternately moving said spindles.

9. The film magazine of claim 5 in which the said means comprises a reciprocable cam plate movable on the magazine into three positions, one for engaging and moving the takeup spool spindle, another for engaging and moving the supply spool spindle and a third for disengaging both spool spindles.

10. The film magazine of claim 5 in which the said means is movable on the magazine into three positions, one for moving the takeup spool spindle outwardly, another for moving the supply spool spindle outwardly and a third neutral position where neither spindle is moved outwardly.

11. A film magazine comprising a casing, a film supply spool in said casing having an axially movable spindle provided at an exposed end with a drive wheel, a film takeup spool in said casing also having an axially movable spindle provided at an exposed end with a drive wheel, a movable film guide device in said magazine located at a film feeding position, and means on said casing for alternately moving the takeup and supply spool spindles axially outwardly to position the drive wheels thereof operatively for a film winding operation and for a film rewinding operation respectively, the said means being connected to the film guide device to move the latter into and out of film feeding positions respectively.

12. The film magazine of claim 11 in which the said means is movable into three positions, one for moving the takeup spool spindle, another for moving the supply spool spindle and a third neutral position for moving neither spindle, the film guide device being movable to the film feeding position only in the first mentioned position assumed by said means.

13. In the film magazine of claim 11, a spring active on said means for urging the same to its film winding and film feeding position.

14. The film magazine of claim 11, in which the magazine casing is provided with an opening along said guide device for admitting a film driving element.

15. The film magazine of claim 11, in which the magazine casing is provided with a light admitting aperture between said spools and with an opening along said guide device for admitting a film driving element.

16. The film magazine of claim 11, in which the said means comprises a reciprocable cam plate for alternately engaging and moving said spindles, said cam plate being connected to said film guide device.

17. The film magazine of claim 11, in which the said means comprises a reciprocable rod, a cam plate having oppositely directed wings fixed medially to said rod, an element connecting said rod to the guide device, and a spring active on said rod.

FREEMAN H. OWENS.